(12) United States Patent
Kumakura et al.

(10) Patent No.: US 10,910,646 B2
(45) Date of Patent: Feb. 2, 2021

(54) CATHODE MATERIAL FOR A LITHIUM-ION RECHARGEABLE BATTERY

(71) Applicants: Umicore, Brussels (BE); Umicore Korea Ltd., Chungnam (KR)

(72) Inventors: Shinichi Kumakura, Kobe (JP); Jing Zhang, Cheonan (KR); Jens Paulsen, Daejeon (KR)

(73) Assignees: Umicore, Brussels (BE); Umicore Korea Ltd., Chungnam (KR)

( * ) Notice: Subject to any disclaimer, the term of this patent is extended or adjusted under 35 U.S.C. 154(b) by 149 days.

(21) Appl. No.: 15/568,000

(22) PCT Filed: Apr. 15, 2016

(86) PCT No.: PCT/IB2016/052147
§ 371 (c)(1),
(2) Date: Oct. 20, 2017

(87) PCT Pub. No.: WO2016/170454
PCT Pub. Date: Oct. 27, 2016

(65) Prior Publication Data
US 2018/0145320 A1    May 24, 2018

(30) Foreign Application Priority Data

Apr. 23, 2015 (EP) .................................... 15164844

(51) Int. Cl.
*H01M 4/525* (2010.01)
*H01M 4/505* (2010.01)
(Continued)

(52) U.S. Cl.
CPC .......... *H01M 4/525* (2013.01); *C01G 39/006* (2013.01); *C01G 45/1221* (2013.01);
(Continued)

(58) Field of Classification Search
CPC ...... H01M 4/485; H01M 4/505; H01M 4/525; H01M 2004/021; H01M 2004/028;
(Continued)

(56) References Cited

U.S. PATENT DOCUMENTS

| | | | |
|---|---|---|---|
| 2003/0129495 A1 | 7/2003 | Miyashita | |
| 2005/0019662 A1 | 1/2005 | Suhara | |
| 2011/0195309 A1 | 8/2011 | Nina et al. | |
| 2013/0101900 A1 | 4/2013 | Nagai | |
| 2013/0146807 A1 | 6/2013 | Takagi | |
| 2014/0099549 A1 | 4/2014 | Ceder et al. | |
| 2016/0344026 A1* | 11/2016 | Yabuuchi | ............... H01M 4/485 |

FOREIGN PATENT DOCUMENTS

| | | |
|---|---|---|
| CN | 102228836 A | 11/2011 |
| CN | 102306779 A | 1/2012 |

(Continued)

OTHER PUBLICATIONS

International Search Report for PCT/IB2016/052147, dated Jul. 29, 2016.
(Continued)

*Primary Examiner* — Brittany L Raymond
(74) *Attorney, Agent, or Firm* — NK Patent Law (57) ABSTRACT

A positive electrode for a rechargeable battery, comprising a lithium metal oxide powder having a layered crystal structure and having the formula $Li_xTm_yHm_zO_6$, with $3 \le x \le 4.8$, $0.60 \le y \le 2.0$, $0.60 \le z \le 2.0$, and $x+y+z=6$, wherein Tm is one or more transition metals of the group consisting of Mn, Fe, Co, Ni, and Cr; wherein Hm is one or more metals of the group consisting of Zr, Nb, Mo and W. The lithium metal oxide powder may comprise dopants and have the formula $Li_xTm_yHm_zM''_mO_6 - \delta A\delta$, wherein A is either one or more elements of the group consisting of F, S or N; and M'' is either one or more metal of the group consisting of Ca, Sr, Y, La, Ce and Zr, with either $\delta>0$ or $m>0$, $\delta \le 0.05$, $m \le 0.05$ and $x+y+z+m=6$.

9 Claims, 4 Drawing Sheets

(51) Int. Cl.
| | |
|---|---|
| *H01M 4/485* | (2010.01) |
| *C01G 53/00* | (2006.01) |
| *H01M 10/0525* | (2010.01) |
| *H01M 10/42* | (2006.01) |
| *C01G 45/00* | (2006.01) |
| *C01G 39/00* | (2006.01) |
| *C01G 45/12* | (2006.01) |
| *H01M 4/02* | (2006.01) |

(52) U.S. Cl.
CPC ............ *C01G 53/42* (2013.01); *C01G 53/44* (2013.01); *H01M 4/485* (2013.01); *H01M 4/505* (2013.01); *H01M 10/0525* (2013.01); *H01M 10/4242* (2013.01); *C01P 2002/20* (2013.01); *C01P 2002/52* (2013.01); *C01P 2002/72* (2013.01); *C01P 2002/74* (2013.01); *C01P 2002/76* (2013.01); *C01P 2006/40* (2013.01); *H01M 2004/021* (2013.01); *H01M 2004/028* (2013.01)

(58) Field of Classification Search
CPC ........... H01M 10/0525; H01M 10/4242; C01P 2002/20; C01P 2002/52; C01P 2002/74; C01P 2002/72; C01P 2006/40; C01G 53/42; C01G 53/44; C01G 39/006; C01G 45/1221

See application file for complete search history.

(56) References Cited

FOREIGN PATENT DOCUMENTS

| EP | 3085669 A1 | 10/2016 |
|---|---|---|
| JP | 1994283174 A | 10/1994 |
| JP | 3835412 B2 | 10/2006 |
| JP | 2014040958 A | 6/2014 |
| JP | 2015166291 A | 9/2015 |
| KR | 1020120017671 | 2/2012 |
| WO | 2011034508 A1 | 3/2011 |
| WO | 2011111228 A1 | 9/2011 |
| WO | 2014055665 A2 | 4/2014 |

OTHER PUBLICATIONS

Scholz, Fritz, et al., "Electrode", Electrochemical Dictionary, Nov. 2, 2008, pp. 202-203.

Mandal, Tapas Kumar, et al, Supporting Information for a New Route to Ordered Double Perovskites: Synthesis of Rock Salt Oxides, Li4MWO6, and their Transformation to Sr2MWO6 (M=Mg, Mn, Fe, Ni) via Metathesis, Solid State and Structural Chemistry Unit, Indian Institute of Science, Bangalore 560 012 and Jawaharlal Nehru Centre for Advanced Scientific Research, Bangalore 560 064 India, Apr. 8, 2005, pp. 1-7.

European Search Report for EP15164844, dated Jun. 15, 2015.

Urban, A., et al., The Configurational Space of Rocksalt-Type Oxides for High-Capacity Lithium Battery Electrodes, Advanced Energy Materials, (2014), pp. 1-9.

Kuzma, M., et al., Electrochemical Activity of Li2FeTiO4 and Li2MnTiO4 as Potential Active Materials for Li ion batteries: A comparison with Li2NiTiO4, Journal of Power Sources, vol. 189 (2009), pp. 81-88.

Thackeray, M.M., et al., "Li2MnO3-stabilized LiMO2 (M=Mn, Ni, Co) Electrodes for Lithium-Ion Batteries", Journal of Materials Chemistry, vol. 17 (2007), pp. 3112-3125.

Sebastian, L., et al., "Li2MTiO4 (M=Mn, Fe, Co, Ni): New cation-disordered Rocksalt Oxides Exhibiting Oxidative Deintercalation of Lithium", Journal of Solid State Chemistry, vol. 172 (2003), pp. 171-177.

Lee, J., et al., "Unlocking the Potential of Cation-Disordered Oxides for Rechargeable Lithium Batteries", Science, vol. 343 (Jan. 31, 2014), pp. 519-523.

Vega-Glez, M., et al., "Short Range Order in New Rock Salt Type Structures of the System Li3NbO4—CoO", Revista Mexicana De Fisica, vol. 51, No. 3 (Jun. 2005), pp. 299-303. (English abstract provided).

Mather, G.C., et al., "Continuous Order-Disorder Transition in Li3Ni2NbO6 and Cr-Doped Li3Ni2NbO6 Rock Salt Structures", Journal of Solid State Chemistry, vol. 124 (1996), pp. 214-219.

Mandal, T.K., et al., "New Route to Ordered Double Perovskites: Synthesis of Rock Salt Oxides, Li4MWO6, and Their Transformation to Sr2MWO6 (M=Mg, Mn, Fe, Ni) via Metathesis", Chem. Mater. vol. 17 (2005), pp. 2310-2316.

McCalla, E., et al., "Novel Complex Stacking of Fully-Ordered Transition Metal Layers in Li4FeSbO6 Materials", Chem. Mater., vol. 27, No. 5 (2015), pp. 1699-1708.

Mather, G.C., et al., "Synthesis and Structures of the Partially Ordered Rock Salt Phases, Li3M2xO6: M=Mg, Co, Ni; X=Nb, Ta, Sb", Journal of Materials Chemistry, (Jan. 1, 1995), pp. 1177-1.

Sathiya, M., et al., "Li4NiTeO6 as a Positive Electrode for Li-Ion Batteries", Chemical Communications, vol. 49, No. 97 (Jan. 2013), p. 11376.

Yabuuchi, N., et al., "Novel Lithium Insertion Material of LiCo ⅓ Ni ⅓ Mn ⅓O2 for Advanced Lithium-Ion Batteries", Journal of Power Sources, vol. 119 (Jun. 2003), pp. 171-174.

* cited by examiner

CATHODE MATERIAL FOR A LITHIUM-ION RECHARGEABLE BATTERY

This application is a National Stage application of International Application No. PCT/IB2016/052147, filed Apr. 15, 2016. This application also claims priority to European Application No. EP15164844.1, filed Apr. 23, 2015.

TECHNICAL FIELD AND BACKGROUND

This invention relates to a powderous lithium metal oxide, applicable as a cathode material in rechargeable lithium battery. More particularly, this material contains heavy metals and transition metals, has a high capacity and is structurally stable.

With the strong development of the lithium-ion battery market, there is a demand for cathode materials that combine—amongst others—low cost, high energy and good cyclability. At the early stages, commercial Li-ion batteries were mostly using $LiCoO_2$ (abbreviated to LCO) as cathode material. LCO consists of layers of lithium ions lying between slabs of $CoO_6$ octahedra, having the space group R-3m. Batteries using LCO cathodes may provide a high capacity, e.g. 150-160 mAh/g when cycled at 3-4.3V. The manufacture of commercial LCO is also relatively easy. However, LCO has serious drawbacks, the main one being the relative scarcity of Co resources. According to "The Cobalt Development Institute", currently already more than 30% of the worldwide Co usage is for battery applications. The thermal stability of LCO is still a concern, and makes it susceptible to thermal runaway in case of high temperature operation or overcharging. Some kinds of material with different structures have been proposed and developed, like the $LiMPO_4$ olivine family (also referred to as LFP, with M=Fe), however, these material are not prevailing in the high-energy lithium ion batteries, and are mostly considered only in the case of high-power applications.

Layered materials are still prevailing in the high-energy application. Numerous attempts have been carried out to look for compositional alternatives for alleviating the high cost and improving the stability of LCO. Among them, the major substitute for LCO having emerged in recent years is lithium nickel-manganese-cobalt oxide (abbreviated to NMC). NMC materials also have a layered structure and a space group R-3m like LCO. The addition of Ni and Mn cuts down the price since Ni and Mn are more abundant. With an increasing amount of Ni, the discharge capacity of NMC becomes much higher than LCO, since 200 mAh/g can be achieved when cycled at 3-4.4V. At the same time, the thermal stability is decreased with an increasing Ni content, which results in materials being more difficult to manufacture. The preparation of NMC is more complex than LCO because special precursors are needed. Precursors of mixed transition metal hydroxides or carbonates have to be prepared having the NMC target composition. Moreover, compared to LCO, NMC has a low solid state Li-ion diffusion constant. This can limit the maximum possible particle size for certain compositions, and lead to a relatively large specific surface area, which can enhance the dissolution of transition metals in the electrolyte, provoking also electrolyte decomposition or other issues of battery degradation. Also worrying is that NMC materials have the problem of cation mixing meaning that there is a high amount of Ni on Li $3a$ sites (being the sites within the layers predominantly filled by Li atoms), which can deteriorate their electrochemical performance. Thus, there are still problems to be solved for NMC in its use as a cathode material in a lithium ion battery.

Considering the large demand in battery markets and the further development of lithium ion technology, new cathode materials are still of interest. New materials have the potential to beat current technology and bring possible improvements, whereas current technology like LCO, NMC and LFP are mature and no large improvement is expected. In the case of LCO, LFP and NMC, the reversible lithium ion is limited to less than one mole per mole transition metal. Recently, some research has disclosed novel cathode material with higher amounts of exchangeable lithium per unit formula. WO2011/034508A1 discloses a cathode material with a layered structure, denominated as NaCl type, and having the formula $Li_2VTiO_4$ or $Li_2VAlO_4$. This kind of layered material hosts two lithium ions for each unit of chemical formula, and presents an excellent electrochemical activity in lithium ion batteries. In literature, there is also described a group of cathode materials having a layered structure $Li_2MTiO_4$ (M=Fe, Mn, Ni, Co), for example in "Journal of solid state chemistry, 2003, 172 (1): 171-1772" and "Journal of power sources, 2009, 189, 81-88". Their theoretical capacity is over 300 mAh/g. However, their applicability is limited by a difficult and precise synthesis that is not adapted for mass production.

A $Li_2MnO_3$-based composite material $Li(Li_xNi_yCo_zMn_wO_2)$ has recently attracted attention with a capacity higher than 220 mAh/g, which was reported in "Journal of Material Chemistry, 2007, 17, 3112-3125". These lithium-rich oxides are basically considered to be composed of two different layered oxides $Li_2MnO_3$ and $LiMO_2$, and potentially allow to cycle more than one Li ion per transition metal. However, this material is still at an early stage. It has to overcome some challenges to realize the application in commercial lithium ion battery, such as structure changes and voltage degradation during cycling. Such material differs from other cathode materials by having a lithium to transition metal ratio larger than 1, they are Li rich. Li rich materials can show irreversible structural changes during the first charge cycle. This concept is further developed by the Ceder group, e.g. in "Advanced Energy Material, 2014, 4, 1400478", Ceder et al generalize the cubic rock salt-like structures of lithium metal oxides with formula unit $LiMO_2$, where M typically represents one or more metallic species. They propose a diffusion model which supports the Li-excess lithium metal oxides as high-capacity electrode materials. Based on this theory, Li-excess material with the formula of $Li_{1.233}Mo_{0.467}Cr_{0.3}O_2$ is disclosed in "ScienceXpress, 2014, 1246432" and WO2014/055665. This material has a remarkable high capacity of 265.6 mAh/g at C/20 in the first cycle of 3-4.3 V. However, such high capacity is rapidly weakening in the subsequent cycles, due to the transition of the initial layered structure to a disordered structure after the first cycle. Besides, this material shows a very large polarization manifested by a very sloped voltage profile. The polarization refers to the voltage gap between charge and discharge in the voltage profile. A large polarization indicates much energy loss. This is also caused by the cation disordering during cycling. It follows that there is a need for a more stable layered structure material, allowing less polarization and maintaining its layered structure during cycling.

A layered structure refers to a crystal structure also called "ordered rocksalt structure" which contains layers of lithium cations alternating with layers of metal M, within a close packed oxygen crystal lattice. A well layered structure has a small degree of cation mixing, cation mixing being the presence of non-lithium metal cations on the lithium layers. A stable layered crystal structure refers to a material which allows that lithium is extracted ("de-intercalated") from the lithium layers during charge and re-inserted during discharge, thereby keeping the layered crystal structure intact. Particularly, there is only a limited transfer of non-lithium cations from the metal slabs to the lithium slabs. A well layered stable crystal structure with cation mixing is a preferred structure to obtain good electrochemical performance. In the layered oxides with typical space group of R-3m, the integrated intensity ratio of Bragg peak (003) to (104) (I003/I104) (we use hexagonal indexing notation) is strongly related to the cation mixing level. A high value of I003/I104 indicates a stable layered structure with low cation mixing, which is believed to avoid the structural transition during first cycle and to reduce polarization.

The same trend is valid for other lithium-rich layered structures derived from space group of R-3m. They possess superstructures obtained by introducing cation ordering to the structure of R-3m, such as by the addition of $Li_2MnO_3$, which has a rocksalt type layered structure with a space group of C2/m. There are many potential layered superstructure derivatives from R-3m. By carefully controlling of the cation mixing level, these potential structures are quite likely to possess high stability and small polarization during cycling when applied as cathode material in batteries.

Therefore, this invention aims to provide layered lithium-rich transition metal oxides having a formula with a high amount of lithium that can be (de)intercalated, with structural and electrochemical properties—such as high ordering, a stable crystalline structure and good cyclability—that are quite promising for their utilization as cathode material in a rechargeable lithium ion battery.

SUMMARY

Viewed from a first aspect, the invention can provide the following product embodiments:

Embodiment 1

A positive electrode for a rechargeable battery, comprising a lithium metal oxide powder having a layered crystal structure and having the formula $Li_xTm_yHm_zO_6$, with $3 \leq x \leq 4.8$, $0.60 \leq y \leq 2.0$, $0.60 \leq z \leq 2.0$, and $x+y+z=6$, wherein Tm is one or more transition metals of the group consisting of Mn, Fe, Co, Ni, and Cr; wherein Hm is one or more metals of the group consisting of Zr, Nb, Mo and W. It is evident that the material is electro-neutral.

Embodiment 2

The lithium metal oxide powder may further comprise dopants having the formula $Li_xTm_yHm_zM''_mO_{6-\delta}A_\delta$, wherein A is either one or more elements of the group consisting of F, S or N; and M'' is either one or more metal of the group consisting of Ca, Sr, Y, La, Ce and Zr, with either $\delta > 0$ or $m > 0$, $\delta \leq 0.05$, $m \leq 0.05$ and $x+y+z+m=6$. The advantage of having dopants can be either improvement on structural and thermal stability or enhancement on the lithium ionic conductivity.

Embodiment 3

The lithium metal oxide powder may have a diffraction peak intensity ratio R between the largest peak at $18.5 \pm 1.5°$ and the largest peak at $43.5 \pm 1.5°$ in the X-ray powder diffractometry using a Cu-Kα line in the X-ray source, with $R=I_1/I_2$, where $I_1$ is the integrated intensity of the largest peak at $18.5 \pm 1.5°$ and $I_2$ is the integrated intensity of the largest peak at $43.5 \pm 1.5°$, wherein $R > 0.55$. In this embodiment it is preferred that R is greater than 0.7, greater than 1.0, at least 1.5, or even at least 2.0. A larger number for R indicates a higher ordering of the layered structure.

Embodiment 5 here $x \geq 3$ and Hm=Nb.

Embodiment 6 here $x=4$ or about 4, and Hm is either W or Mo, and Tm is either Cr or Mn. In this embodiment it is preferred that the lithium metal oxide powder has a diffraction peak intensity ratio R between the largest peak at $18.5 \pm 1.5°$ and the largest peak at $43.5 \pm 1.5°$ in the X-ray powder diffractometry using a Cu-Kα line in the X-ray source, with $R=I_1/I_2$, where $I_1$ is the integrated intensity of the largest peak at $18.5 \pm 1.5°$ and $I_2$ is the integrated intensity of the largest peak at $43.5 \pm 1.5°$, and with $R \geq 1.5$.

Embodiment 7 here $x=4$ or about 4, Hm=W and Tm is either Mn or $Ni_nMn_mCo_c$, with $0 \leq n \leq 1$, $0 \leq m' \leq 1$, $0 \leq c \leq 51$, and $n+m'+c=1$. In this embodiment it is preferred that the lithium metal oxide powder has a diffraction peak intensity ratio R between the largest peak at $18.5 \pm 1.5°$ and the largest peak at $43.5 \pm 1.5°$ in the X-ray powder diffractometry using a Cu-Kα line in the X-ray source, with $R=I_1/I_2$, where $I_1$ is the integrated intensity of the largest peak at $18.5 \pm 1.5°$ and $I_2$ is the integrated intensity of the largest peak at $43.5 \pm 1.5°$, and with $R \geq 1.5$.

Embodiment 8

The electrode may comprise a lithium metal oxide powder having a layered structure wherein the cations are octahedrally surrounded by oxygen, and wherein the Li and Tm atoms are distributed in octahedral sites surrounding $O_6$ octahedra, the structure being maintained during a cycle of charge and discharge in a potential range of 2.7-4.3 V vs. $Li^+/Li$ in a rechargeable battery.

Embodiment 9 here $x=4$ or about 4, Tm=Ni, Hm=W, and the structure is C2/m. In this ordered rocksalt structure the cations may be octahedrically surrounded by oxygen and 2d Li layers of edge-shared $LiO_6$ octahedron exist.

Embodiment 10

The lithium metal oxide powder has a crystallographic density $>4.1$ g/cm$^3$.

Each of the individual embodiments described hereabove can be combined with one or more of the embodiments described before it.

Viewed from a second aspect, the invention can provide rechargeable batteries comprising the positive electrodes according to the different product embodiments of the invention.

DETAILED DESCRIPTION

This invention focuses on the discovery of novel layered materials, which can be used as cathode material in the application of a lithium ion battery. Considering the benefits of high amounts of available Li ion per formula, the group of layered materials, like $Li_4MM'O_6$ is investigated, where M refers to transition metals such as Ni and Mn. In this invention, so-called heavy metals, like W, Zr, Nb or Mo are introduced as the component M'. These heavy metals possess a high valence state—up to +6—and are likely to stabilize Li-rich layered structures, like in the compounds $Li_4WO_5$, $Li_4MoO_5$ and $Li_3NbO_4$. When applied as cathode material in a battery, a stable crystalline structure is a necessary requirement to obtain good cyclability. It is believed that the addition of these heavy metals will also stabilize the layered structure of $Li_4MM'O_6$. Some of the described lithium metal oxide powders are known from the prior art, but were never developed for use in a lithium rechargeable battery. For example, Mandal in Chem. Mater. 2005; 17, 2310-2316 describes $Li_4MWO_6$ perovskites; Mather in Journal of Solid State Chemistry 124, 214-219 (1996) describes $Li_3Ni_2NbO_6$ rock-salt structures; Vega-Glez in Revista Mexicana de Fisica 51 (3) 299-303 describes rock salt $Li_{(3-3x)}Co_{4x}Nb_{(1-x)}O_4$ structures;

The materials according to the invention have the general formula $Li_xTm_yHm_zO_6$ (Tm is transition metal and Hm is heavy metal), wherein x=3-4.8, y=0.60-2.0, z=0.60-2.0, x+y+z=6, where small deviations in the values of x, y and z are possible however when additional impurities or dopants are present; Tm being one or more transition metals Mn, Fe, Co, Ni, Cr, Ti and V; and Hm being one or more heavy metals Zr, Nb, Mo, W and Ru. There might be some dopants in the structure, resulting in the formula $Li_xTm_yHm_zO_{6-\delta}A_\delta$, with A being either one or more of F, S or N. The materials can also contain metallic dopants and have the general formula $Li_xTm_yHm_zM''_mO_{6-\delta}A_\delta$, where M'' is one or more of Ca, Sr, Y, La, Ce and Zr, and x+y+z+m=6. This group of materials contains more than one available lithium ion for deintercalation when applied in a battery. In some embodiments, the amount of available lithium ions reaches up to 4, and the redox reaction of the transition metals, like $Ni^{2+}$ oxidizing to $Ni^{4+}$, or $Cr^{2+}$ oxidizing to $Cr^{6+}$ makes the reversible release and uptake of four lithium ions possible, which is promising for achieving a high capacity.

The materials according to the invention all have a layered structure. The distribution of atoms within the layers leads to a structure of lithium layers alternating with Li/Tm/Hm layers. In each layer, all the cations are octahedrally surrounded by oxygen. Specifically, if the crystal structure is r-3M, Li and Tm atoms are statistically distributed in the same octahedral site, surrounding octahedrals of $HmO_6$. If the crystal structure is a superstructure of r-3M then Li/Tm/Hm might show cation ordering within the metal slabs. The ordering of the cations into a well layered structure is a key factor related to the electrochemical performance, such as cyclability, as a highly ordered structure is required to obtain a good cycling performance. The ordering of a layered structure can be evaluated by investigating the Bragg peak ratios in the X-ray diffraction pattern, specifically the ratio of the integrated intensities of the peaks at resp. 18.5±1.5° and 43.5±1.5°, each of these being the largest in that region. In order to get an ordered structure, with low cation mixing, the ratio of the Bragg peaks should be greater than 0.55, preferably 0.7 or even 0.9. In some embodiments, the peak ratio is 1.5 or more, 1.7 or more, even 2.0 or more. The practical upper limit for the ratio is somewhere around 2.5.

This invention observes that the material according to the invention has a relatively stable layered structure when applied in a battery. The layered structure basically remains during cycling, which is a similar behavior than for the commercial cathode materials LCO and NMC, and is believed to be an important factor for the cycling stability in batteries. In one embodiment, the composition of $Li_4NiWO_6$ keeps the layered structure with a space group of C2/m during the $1^{st}$ cycle of charge/discharge in a potential range of 2.7-4.3 V. It is only at higher voltages like ≥4.9 V or lower voltages like ≤1.5 V that the layered structure starts to collapse. It is also observed that the ratio of the Bragg peaks at 18.5±1.5° ((001) plane) and 43.5±1.5° ((131) plane) changes during charge. When charging up to a high voltage, the peak ratio decreases. So the ordering of structure is lowered during charge and the structure has the risk of collapsing. Even worse, if the pristine material had a certain amount of cation mixing in the layered structure, upon charging, the structure would collapse even at low voltage. Therefore, this again proves that the ordering of the layered structure has an important effect on the electrochemical performance of material in batteries. A highly ordered material is preferred in the application of batteries with good cyclability.

Coin Cell Test

The layered lithium-rich transition metal oxide powders are electrochemically tested at a small scale in a coin cell, as follows: the pristine powder is mixed with carbon at a ratio 4:1 (active material: carbon) and ball milled together for 12 hours. The active mixture is further blended with a binder material to a composition of 72:10:18 (active material: binder: carbon), and is loaded on an aluminum foil. The negative electrode is a lithium foil having a thickness of 500 μm (origin: Hosen). The electrode's active loading is 2.5 mg/cm². The separator (from SK Innovation) is located between the positive electrode and a negative electrode. 1M $LiPF_6$ in EC/DMC (1:2) is used as electrolyte, and dropped between separator and electrodes. The as-prepared coin cells are charged/discharged in a potential range of 3.0-4.1 V for 40 cycles. The current density is 14.5 mA/g (corresponding to C/20, where 1C represents a full charge or discharge in one hour). This invention observes a good cyclability of coin cells when the layered lithium metal oxide according to the invention is used as positive electrode. In one embodiment, the coin cell test of $Li_4NiWO_6$ shows that the discharge capacity is almost constant after 40 cycles in the potential range of 3-4.IV.

Ex-Situ XRD Coin Cell Test

The layered lithium-rich transition metal oxide powders according to the invention are ex-situ tested through X-ray diffraction after been electrochemically charged at a small scale in a coin cell. The coin cell are made as described above. The prepared cells are electrochemically tested as shown in Table 1, at a current density of 14.5 mA/g. Then the coin cell is disassembled and the cathode electrode is tested by X-ray diffraction.

TABLE 1

Ex-situ XRD schedule

| Test No | Charge voltage (V) | Discharge voltage (V) |
| --- | --- | --- |
| 1 | 4.1 | — |
| 2 | 4.3 | — |
| 3 | 4.9 | — |
| 4 | 4.9 | 3.5 |
| 5 | 4.9 | 2.7 |
| 6 | 4.9 | 1.5 |

X-Ray Diffraction Test

The cathode material are tested by X-ray diffraction to check the structural properties. The XRD tests are conducted in a Ultima IV device (Rigaku corp.) and the X-ray source is Cu-Kα. This invention provides cathode materials having a layered structure like the commercial cathode materials LCO and NMC. In the case of LCO and NMC, they possess a space group of R-3m and their ordering of layer structure can be evaluated by the ratio of the integrated intensities of Bragg peaks (003) to (104) in the XRD pattern. Similar to LCO and NMC, the material according to the invention can also be evaluated by such a peak ratio to check the ordering of the layered structure. In the measured patterns of this invention, Bragg peaks located at 2θ equal to 18.5±1.5° and 43.5±1.5° are chosen, each being the largest in the region. The ratio of the integrated intensities of these two peaks can be calculated and gives an indication of the ordering degree of the layered structure. A high peak ratio means that the layered structure is highly ordered, where low peak ratios indicate a poor ordering in the layered structure.

The invention is further illustrated in the following examples:

Example 1: Preparation and Electrochemical Properties of $Li_4NiWO_6$

This example presents the layered cathode material $Li_4NiWO_6$. This material is prepared following the procedure below:

1. Blending of precursors: 1.25% excess lithium hydroxide monohydrate ($LiOH-H_2O$), with $WO_3$ and nickel acetate ($Ni(CH_3COO)_2$-$4H_2O$) powders in just proportions are homogeneously blended in just proportions to obtain the stoichiometric composition.
2. Sintering: after mixing, the mixture is sintered at 1000° C. for 12 hours under dry air. Dry air is continuously pumped into the sintering equipment at a flow of 5 L/min.
3. Post-treatment: after sintering, the sintered material is crushed and sieved so as to obtain a non-agglomerated powder.

The obtained powder is labelled E1, and investigated by X-ray diffraction.

Figure 1:
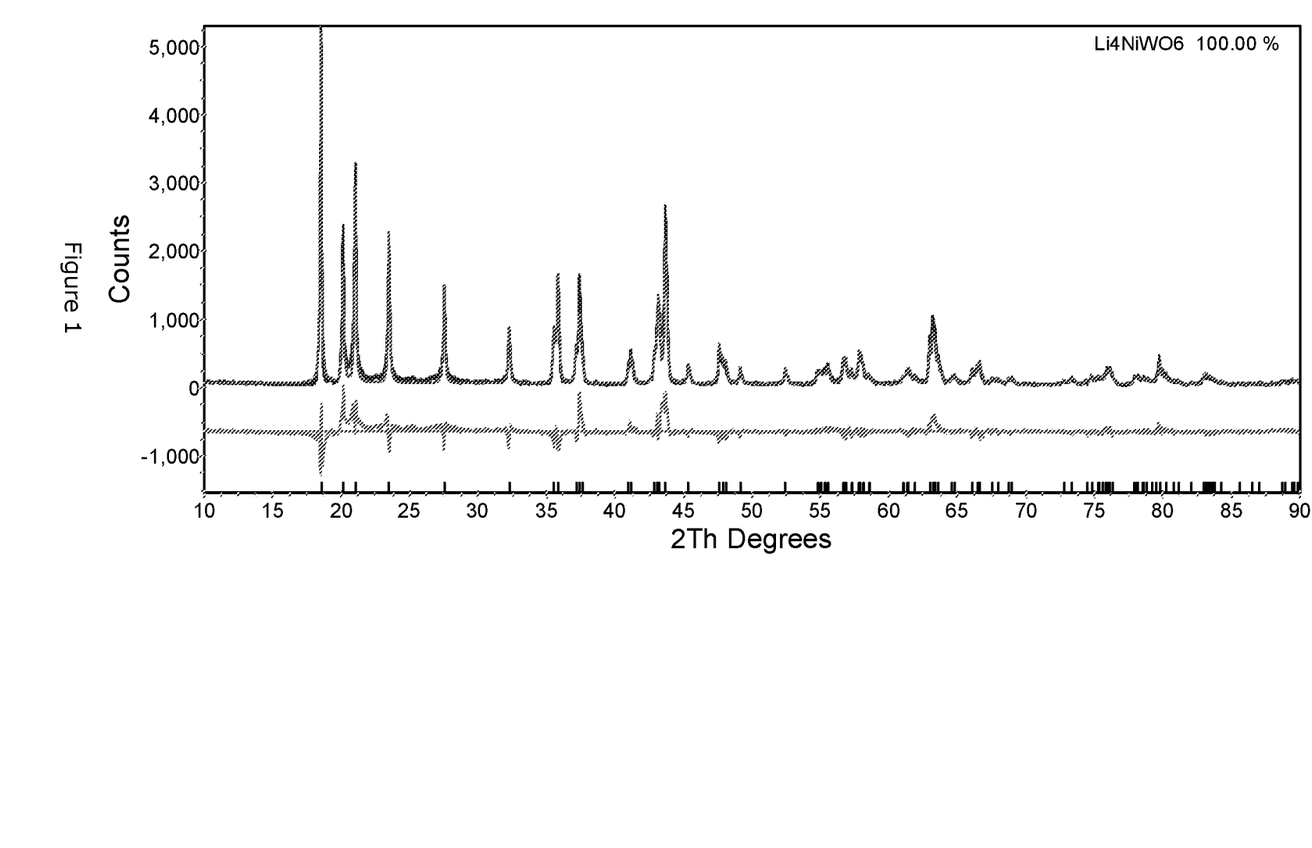
FIG. 1: X-ray powder diffraction (XRD) pattern of the as prepared $Li_4NiWO_6$ cathode material

FIG. 1 shows the obtained XRD pattern (2Th=2θ), together with the fitting curve of Rietveld refinement by TOPAS 3.0 software. A single phase with a C2/m space group is fitting in the measured pattern. Refinement gives a layered structure, with Li layers alternating with Li/Ni/W layers. Bragg peak (001) at 18.5° and Bragg peak (131) at 43.7° are chosen to evaluate the ordering of structure. The ratio of these Bragg peaks is around 1.8, its value is given in Table 2 below. As described in the "X-ray diffraction test", a big ratio is an indication of high ordering of the layered structure. Thus, the E1 sample has a highly ordered layered structure.

Figure 2:
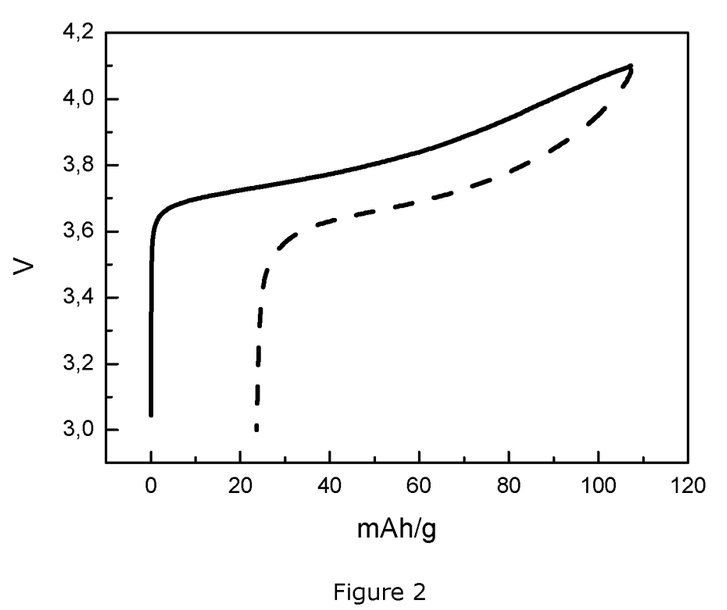
FIG. 2: Charge/Discharge curves of $Li_4NiWO_6$ between 3.0 and 4.1V
Figure 3:
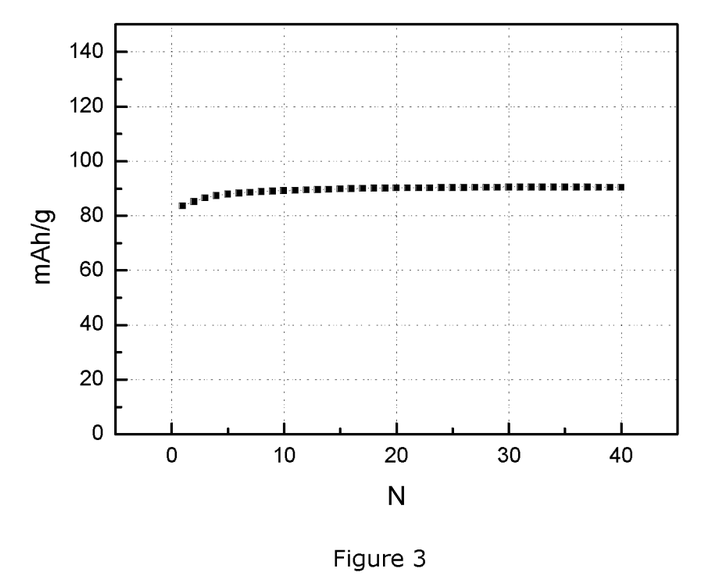
FIG. 3: Cycling performance of $Li_4NiWO_6$ between 3.0 and 4.1V

The electrochemical performance of E1 is tested in a coin cell as described in "Coin cell test". FIG. 2 (Voltage in V versus capacity in mAh/g) shows the first cycle curve of the coin cell based on E1—the charge is the continuous line, the discharge is the dotted line. A relatively low polarization is observed. The charge and discharge curve are roughly parallel indicating that no major structural changes happened during the cycle. The discharge capacity is around 90 mAh/g. FIG. 3 (discharge capacity in mAh/g versus cycle number N) presents the cycling performance of the coin cell. It is observed that the discharge capacity is almost constant over 40 cycles. This indicates a good cyclability of the battery when E1 is used as cathode material, which is related to the highly ordered layered structure of E1. Therefore, this example shows that the layered cathode material according to this invention and having the formula $Li_4NiWO_6$ has a good cycling stability. Even though the specific capacity per weight is not high enough compared to e.g. LCO, considering the high weight of tungsten in the composition, the specific capacity per volume will be considerable.

Example 2: Crystal Structure of $Li_4NiWO_6$ During Charge and Discharge

Figure 4:
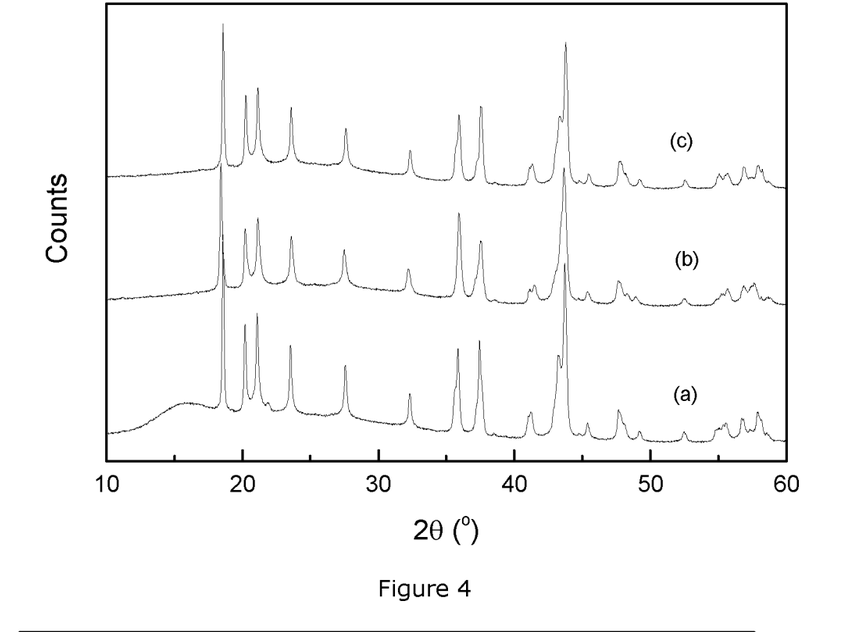
FIG. 4: Ex-situ XRD pattern of $Li_4NiWO_6$ between 3.0 and 4.1V

This example investigates the stability of the crystal structure of sample E1 during a charge/discharge cycle. Ex-situ XRD tests of E1 are processed following the description in "Ex-situ XRD test". FIG. 4 shows ex-situ XRD patterns of the 1st cycle between 3.0 and 4.1V. Pattern (a) refers to E1 after being soaked in the electrolyte, which means that the E1 cathode is assembled in the coin cell and then disassembled without any electrochemical treatment like charging/discharging.

Pattern (b) is corresponding to the E1 sample after being charged up to 4.1V in the coin cell. Pattern (c) represents the XRD pattern of the E1 sample extracted from the coin cell after one cycle of charge/discharge in the range of 3.0-4.1 V. It can be seen that these patterns are quite similar to each other and thus, during the $1^{st}$ cycle, the layered structure of E1 remains unchanged.

Figure 5:
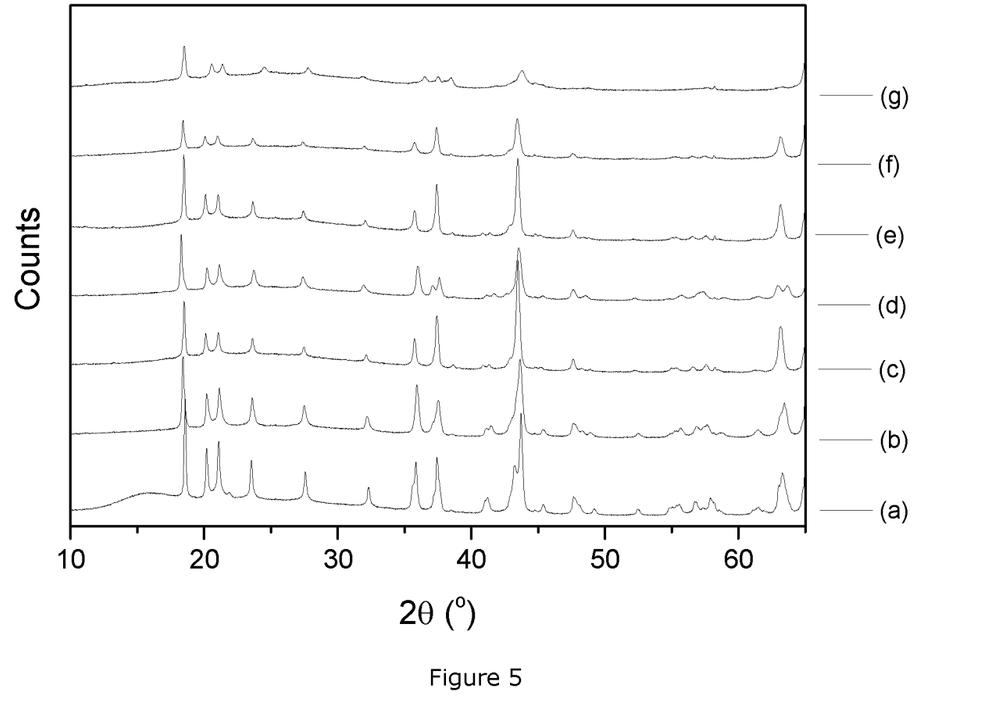
FIG. 5: Ex-situ XRD pattern of $Li_4NiWO_6$ between 1.5 and 4.9V

FIG. 5 shows the ex-situ XRD patterns in a 1st cycle between 1.5 and 4.9V. Pattern (a) refers to the soaked E1 sample, while patterns (b) to (g) refer to the E1 sample extracted from the coin cell at different cutoff voltages during charge/discharge. Patterns (b) to (d) are charged to 4.1V, 4.3 V and 4.9 V respectively, corresponding to Test No 1-3 in Table 1. Pattern (e) to (g) are first charged to 4.9 V and then discharged to 3.5 V, 2.7 V and 1.5 V respectively, corresponding to Test No 4-6 in Table 1. Comparing patterns (a) to (f), there is basically no change, except for slight changes in pattern (d), which corresponds to the sample charged to 4.9 V. Thus until charging to 4.9 V, the layered structure remains intact. During discharge, the structure keeps a layered characteristic until 1.5 V. At 1.5 V, (pattern (g)) we observe peak broadening thus the layered structure starts to collapse. The consistence of layered structure is an indication of good cycle stability, which has been observed in the commercial cathode materials like LCO and NMC. As the E1 sample presents a good consistence of layered structure, this provides support to its high cycling stability.

From pattern (a) to pattern (c), the layer structure is retained, but it is clearly observed that the intensity of Bragg peak at 18.50 decreases and the intensity of Bragg peak at 43.70 increases. This leads to the intensity ratio R of the Bragg peak at 18.5±1.5° to the peak at 43.5±1.5° decreasing from (a) to (c). Thus, the ordering of layered structure is gradually weakening during charging. This can be simply explained since more and more lithium is exacted upon charging, there should be more and more vacancies leading to possibilities of cation mixing, which undermines the stability of the layered structure. With further charging, like up to 4.9 V, the layered structure starts to collapse due to over-delithiation.

Example 3: Preparation and Structural Properties of $Li_3Ni_2NbO_6$

This example presents the layered cathode material $Li_3Ni_2NbO_6$. This material is prepared following the procedure below:
1. Blending of precursors: 2.5% excess lithium hydroxide monohydrate ($LiOH.H_2O$), $Nb_2O_5$ and nickel acetate (Ni $(CH_3COO)_2.4H_2O$) powder are homogenously blended in just proportions to obtain the stoichiometric composition.
2. Sintering: after mixing, the mixture is sintered at 1000° C. for 12 hours under dry air. Dry air is continuously pumped into the sintering equipment at a flow of 5 L/min.
3. Post-treatment: after sintering, the sintered material is crushed and sieved so as to obtain a non-agglomerated powder. The obtained powder is labelled E2.

Figure 6:
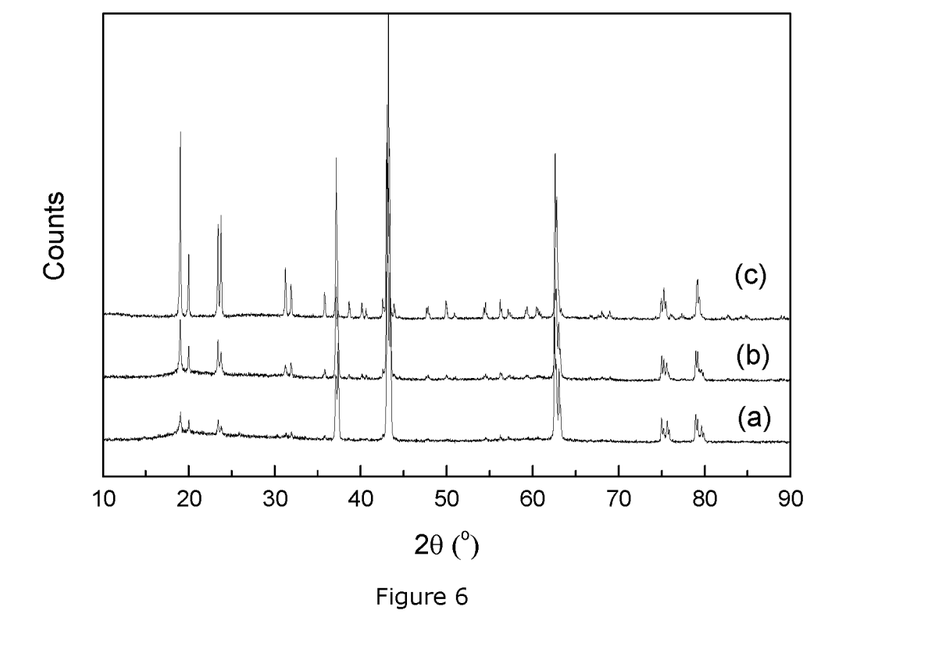
FIG. 6: Ex-situ XRD pattern of $Li_3Ni_2NbO_6$ cathode materials

By changing the sintering conditions, two other samples are obtained, labelled E3 and E4. E3 refers to a sample sintered at 1000° C. for 24 hours, while E4 refers to a sample sintered at 1100° C. for 12 hours. E2, E3 and E4 are tested following the procedure in "X-ray diffraction test". FIG. 6 shows the obtained XRD patterns, where (a), (b) and (c) correspond to resp. samples E2, E3 and E4. All the patterns are fitting into a single phase with space group Fddd, having a layered structure like sample E1. The ordering of structure is evaluated by choosing the Bragg peaks at 19.0° ((111) plane) and 43.2° ((206) plane). The peaks ratios R of E2, E3 and E4 are all smaller than 0.8 (see Table 2), which indicates that there are large amounts of cation mixing. The poor ordering of layered structure generally cannot lead to a good electrochemical performance. However, it can be seen from the patterns that the peak ratio is improving from (a) to (c), thus, by changing the temperature and other conditions, it is feasible to improve the degree of ordering for $Li_3Ni_2NbO_6$ material. As discussed in Example 1, a highly ordered layered structure can be indicative of a good electrochemical performance. In the composition of $Li_3Ni_2NbO_6$, the stoichiometric number of Ni is two. Since each $Ni^{2+}/Ni^{4+}$ redox reaction can allow two Li-ions participating in the delithiation/lithiation, in the compound of $Li_3Ni_2NbO_6$, all the three Li-ions can be (de)intercalated. Thus, this material potentially possesses a high capacity. The electrochemical tests of E2, E3 and E4 show that these phases are electrochemically active, and the discharge capacity of the first cycle is around 40 mAh/g when cycled in the range of 1.5-4.9 V. If the layered character can be improved further, excellent electrochemical properties are feasible as discussed above.

Example 4: Preparation of Other Layered Materials

A layered lithium metal oxide powder $Li_4MnWO_6$ is prepared following the same procedure as described in Example 1, except that the Ni source is replaced by a Mn source being $MnO_2$. The obtained powder is labelled E5. Similar to E5, a layered powder $Li_4Ni_{0.6}Mn_{0.2}Co_{0.2}WO_6$ is prepared in the same procedure, except that the Mn source is replaced by $Ni_{0.6}Mn_{0.2}Co_{0.2}OOH$. This powder is labelled E6. A third material $Li_4CrMoO_6$ is also prepared by the same method as E5, the precursors being changed to $LiOH.H_2O$, $Cr_2O_3$ and $MoO_3$. The obtained powder is labelled E7.

Figure 7:
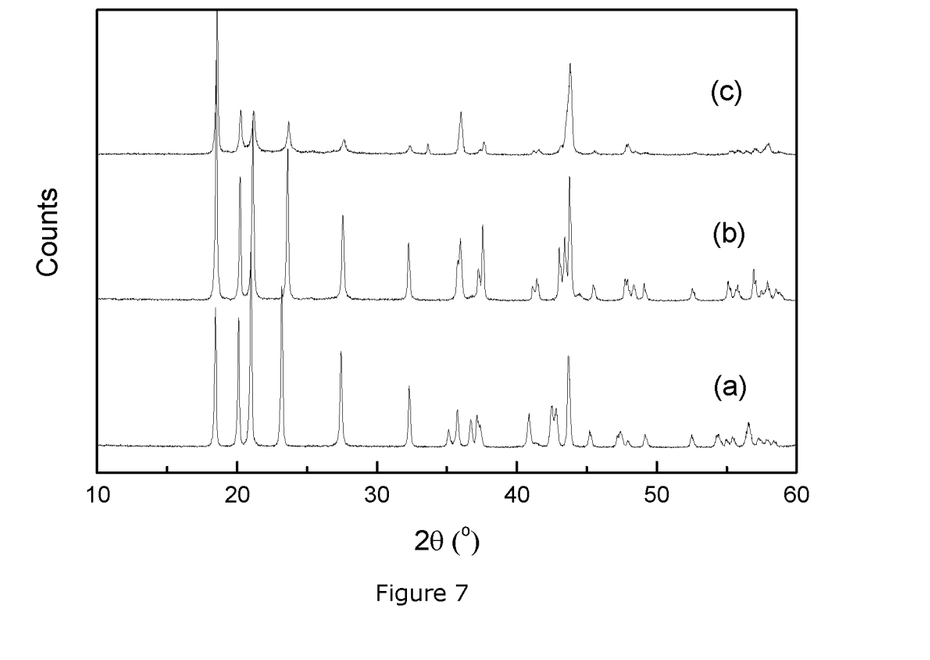
FIG. 7: XRD pattern of layered cathode material (a) $Li_4MnWO_6$, (b) $Li_4Ni_{0.6}Mn_{0.2}Co_{0.2}WO_6$ and (c) $Li_4CrMoO_6$.

FIG. 7 shows the XRD patterns of E5, E6 and E7, which correspond to patterns (a), (b) and (c), respectively. These patterns are all fitted into single phases with a layered structure. The ratio R of peaks located at 18.5±1.5 and 43.5±1.5 is given in Table 2, and are very high. These large peak ratios indicate that the E5, E6 and E7 samples have a highly ordered layered structure. The samples E3 and E6 have a similar composition than sample E1.

In E5, the Mn ion has the same valence state as Ni in E1, which is supposed to play main role in the electrochemical activity. Thus, E5 can have a similar electrochemical behavior as E1, which had a high cycling stability in the coin cell test. For E6, it is equivalent to E1 but with partially substituting Ni for Mn and Co to achieve the transition metal ratio 3:1:1 (Ni:Mn:Co). It has been observed that the substitution of Ni by Mn and Co can stabilize the structure and provide good cyclability. Thus, E6 potentially possesses a good stability as cathode material in the application of a Li ion battery.

In the E7 sample, both Cr and Mo have various valence states, which could raise up to +6, thus this material can be highly electrochemical active. Generally, the Cr ion has a larger possibility to play a main role in the electrochemical behavior, in contrast to the Mo ion. During the delithiation/lithiation, the redox couple of $Cr^{2+}/Cr^{6+}$ can allow all the Li-ions in the formula to participate, which can lead to a high capacity in the Li ion battery. Therefore, sample E7 has a high potential as cathode material in the battery application.

TABLE 2 overview of ratio of Bragg peaks

| Sample ID | Simplified Composition | Integr. area of peak at 18.5 ± 1.5° | Integr. area of peak at 43.5 ± 1.5° | Ratio R |
|---|---|---|---|---|
| E1 | Li—Ni—W | 411.2 | 231.3 | 1.78 |
| E2 | Li—Ni—Nb | 50.2 | 471.3 | 0.11 |
| E3 | Li—Ni—Nb | 103.5 | 453.8 | 0.23 |
| E4 | Li—Ni—Nb | 268.2 | 475.2 | 0.56 |
| E5 | Li—Mn—W | 290.0 | 187.8 | 1.54 |
| E6 | Li-NMC622-W | 525.7 | 256.8 | 2.05 |
| E7 | Li—Cr—Mo | 304.2 | 146 | 2.08 |

The lithium metal oxides according to the invention have a high crystallographic density—that is the unit cell mass divided by the unit cell volume, based on Topas refinement calculations—as is shown in Table 3. Such high values of crystallographic density will allow to achieve high values of volumetric capacity in a battery.

TABLE 3 overview of crystal density by TOPAS refinement

| Compositions | Li—Ni—W | Li—Mn—W | Li—Cr—Mo | Li-NMC-W | Li—Ni—Nb |
|---|---|---|---|---|---|
| Sample ID | E1 | E5 | E7 | E6 | E2 |
| Density (g/cm³) | 5.65 | 6.401 | 4.103 | 5.695 | 5.715 |

The invention claimed is:

1. A positive electrode for a rechargeable battery, comprising a lithium metal oxide powder having a layered crystal structure and having the formula $Li_xTm_yHm_zO_6$, with $3 \leq x \leq 4.8$, $0.60 \leq y \leq 2.0$, $0.60 \leq z \leq 2.0$, and $x+y+z=6$, wherein Tm is one or more transition metals selected from the group consisting of Mn, Fe, Co, Ni, and Cr; wherein Hm is one or more metals selected from the group consisting of Zr, Nb, Mo and W, and wherein the lithium metal oxide powder has a diffraction peak intensity ratio R between the largest peak at $18.5\pm1.5°$ and the largest peak at $43.5\pm1.5°$ in the X-ray powder diffractometry using a Cu-Kα line as the X-ray source, with $R=I_1/I_2$, where $I_1$ is the integrated intensity of the largest peak at $18.5\pm1.5°$ and $I_2$ is the integrated intensity of the largest peak at $43.5\pm1.5°$, wherein $R>1.0$, wherein the lithium metal oxide powder comprises dopants, and has the formula $Li_xTm_yHm_zM''_mO_{6-\delta}A_\delta$, wherein A is either one or more elements selected from the group consisting of F, S or N; and M'' is either one or more metals selected from the group consisting of Ca, Sr, Y, La, Ce and Zr, with either $\delta>0$ or $m>0$, $\delta\leq0.05$, $m\leq0.05$ and $x+y+z+m=6$.

2. The positive electrode of claim 1, wherein $x\geq3$ and Hm=Nb.

3. The positive electrode of claim 1, wherein $x=4$ and Hm is either W or Mo, and Tm is either Cr or Mn.

4. The positive electrode of claim 1, wherein $x=4$, Hm=W and Tm is either Mn or $Ni_nMn_{m'}Co_c$, with $0\leq n\leq1$, $0\leq m'\leq1$, $0\leq c\leq1$, and $n+m'+c=1$.

5. The positive electrode of claim 1, wherein $x=4$, Tm=Ni, Hm=W, and the structure is C2/m.

6. A rechargeable battery comprising a positive electrode, the positive electrode comprising a lithium metal oxide powder having a layered crystal structure and having the formula $Li_xTm_xHm_zO_6$, with $3\leq x\leq4.8$, $0.60\leq y\leq2.0$, $0.60\leq z\leq2.0$, and $x+y+z=6$, wherein Tm is one or more transition metals selected from the group consisting of Mn, Fe, Co, Ni, and Cr; wherein Hm is one or more metals selected from the group consisting of Zr, Nb, Mo and W, and wherein the lithium metal oxide powder has a diffraction peak intensity ratio R between the largest peak at $18.5\pm1.5°$ and the largest peak at $43.5\pm1.5°$ in the X-ray powder diffractometry using a Cu-Kα line as the X-ray source, with $R=I_1/I_2$, where $I_1$ is the integrated intensity of the largest peak at $18.5\pm1.5°$ and $I_2$ is the integrated intensity of the largest peak at $43.5\pm1.5°$, wherein $R>1.0$, wherein the lithium metal oxide powder of the positive electrode comprises dopants, and has the formula $Li_xTm_yHm_zM''O_{6-\delta}A_\delta$, wherein A is either one or more elements selected from the group consisting of F, S or N; and M'' is either one or more metals selected from the group consisting of Ca, Sr, Y, La, Ce and Zr, with either $\delta>0$ or $m>0$, $\delta\leq0.05$, $m\leq0.05$ and $x+y+z+m=6$.

7. The rechargeable battery of claim 6, wherein $x\leq3$ and Hm=Nb.

8. The rechargeable battery of claim 6, wherein $x=4$ and Hm is either W or Mo, and Tm is either Cr or Mn.

9. A rechargeable battery comprising a positive electrode, the positive electrode comprising a lithium metal oxide powder having a layered crystal structure and having the formula $Li_xTm_yHm_zO_6$, with $3\leq x\leq4.8$, $0.60\leq y\leq2.0$, $0.60\leq z\leq2.0$, and $x+y+z=6$, wherein Tm is one or more transition metals selected from the group consisting of Mn, Fe, Co, Ni, and Cr; wherein Hm is one or more metals selected from the group consisting of Zr, Nb, Mo and W, and wherein the lithium metal oxide powder has a diffraction peak intensity ratio R between the largest peak at $18.5\pm1.5°$ and the largest peak at $43.5\pm1.5°$ in the X-ray powder diffractometry using a Cu-Kα line as the X-ray source, with $R=I_1/I_2$, where $I_1$ is the integrated intensity of the largest peak at $18.5\pm1.5°$ and $I_2$ is the integrated intensity of the largest peak at $43.5\pm1.5°$, wherein $R>1.0$, wherein $x\geq3$ and Hm=Nb.

* * * * *